United States Patent
Brokaw et al.

(10) Patent No.: US 7,308,803 B2
(45) Date of Patent: Dec. 18, 2007

(54) INSULATION SYSTEM WITH CONDENSATE WICKING FOR VERTICAL APPLICATIONS

(75) Inventors: Matthew C. Brokaw, Belleville, OH (US); David D. Hokens, Pataskala, OH (US); Patrick Aubourg, Granville, OH (US)

(73) Assignee: Owens Corning Intellectual Capital, LLCDE (US)

(*) Notice: Subject to any disclaimer, the term of this patent is extended or adjusted under 35 U.S.C. 154(b) by 444 days.

(21) Appl. No.: 10/984,237

(22) Filed: Nov. 8, 2004

(65) Prior Publication Data

US 2006/0016204 A1    Jan. 26, 2006

Related U.S. Application Data

(60) Provisional application No. 60/589,682, filed on Jul. 21, 2004.

(51) Int. Cl.
*F25D 23/06* (2006.01)
*F25D 21/14* (2006.01)

(52) U.S. Cl. .......................... 62/273; 62/281; 138/149

(58) Field of Classification Search .......... 62/270–273, 62/281, 285; 138/149; 165/913
See application file for complete search history.

(56) References Cited

U.S. PATENT DOCUMENTS

| | | | |
|---|---|---|---|
| 4,295,669 A | 10/1981 | LaPrade et al. | |
| 5,441,083 A | 8/1995 | Korsgaard | |
| 5,520,009 A | 5/1996 | Jepsen et al. | |
| 5,690,147 A | 11/1997 | Cridland et al. | |
| 6,026,863 A | 2/2000 | Korsgaard | |
| 6,244,302 B1 | 6/2001 | Vikanes | |
| 6,635,322 B1 | 10/2003 | Korsgaard | |
| 2001/0031329 A1 | 10/2001 | Shaffer | |
| 2004/0079431 A1 | 4/2004 | Kissell | |
| 2004/0238059 A1 | 12/2004 | Shaffer et al. | |

*Primary Examiner*—Mohammad M. Ali
(74) *Attorney, Agent, or Firm*—Inger H. Eckert; Maria C. Gasaway

(57) ABSTRACT

Provided is an assembly for insulating substantially vertical runs of cooled surfaces that are continuously or periodically exposed to air or another gas that has a dewpoint temperature above that of the cooled surface, thereby resulting in condensation water vapor on or adjacent the cooled surface. One embodiment of the insulating assembly provides a wicking material layer adjacent the cooled surface that, in combination with transporting and evaporating structures, removes the condensate from the vicinity of the cooled surface and allows for its evaporation into the ambient gas surrounding the exterior surface of the insulating assembly. Another embodiment provides for exposing the condensate to an internal conditioned gas stream to provide for evaporation that does not necessarily utilize an exterior surface. Both embodiments remove condensate from the insulating structure and thereby tend to avoid any substantial condensate accumulation and maintain the insulating performance.

20 Claims, 7 Drawing Sheets

INSULATION SYSTEM WITH CONDENSATE WICKING FOR VERTICAL APPLICATIONS

TECHNICAL FIELD

This invention relates generally to an insulating method and an insulating product apparatus for insulating pipes, ducts or other surfaces that may be continuously or periodically cooled to temperatures below the dew point of the surrounding air. More particularly, this invention pertains to an insulating method and an insulating product providing for improved condensate wicking for cool surfaces having a substantial vertical dimension.

BACKGROUND OF THE INVENTION

Generally, air conditioning (HVAC) systems include such equipment as air handling units, air ducts and chilled water lines. Typically, these HVAC system components are insulated for both thermal and/or acoustic purposes. Conventional insulation used in HVAC systems typically includes a facing layer adhered to an insulation layer and is installed with the facing layer positioned away from the air duct or the cold water pipe, i.e., toward the space through which the component passes. This arrangement tends to reduce migration or diffusion of the moisture-laden air to the cool surfaces and thereby reduces the amount of condensate formed.

During periods of higher relative humidity and/or in instances in which the facing layer is damaged or incomplete, water vapor from the surrounding air may diffuse through the insulation and condense on surfaces that have temperatures below the dew point of the adjacent air. When such condensation occurs, the interface between the insulation and the cool surface will be wetted by the condensate.

The facing layer, or layers, are typically nonporous and act as a barrier between the insulation body and the external environment. However, over time, and especially if, as is often the case, the facing is damaged, water vapor will migrate to and condense on the cool surface. This condensate will accumulate and will enter the adjacent insulating material, thereby reducing its insulating efficiency. These problems can be exacerbated in vertical installations due to the tendency of the condensate to flow downwardly along or adjacent the vertical surfaces resulting in excessive accumulation in the lower portions of the vertical installations and/or in adjoining horizontal portions of the installation.

Previous attempts to address the problem of condensate formation and removal have utilized one or more wicking materials to collect the condensate at or near the cool surface and transport it through a layer of wicking material away from the cool surface to an exterior surface region. Once at or near the exterior of the insulation, the condensate within the wicking material layer can evaporate into the surrounding air. Although this approach works well for substantially horizontal applications, the condensate accumulation associated with components or installations incorporating significant vertical surfaces tends to result in accumulations of condensate in the lower portion of the vertical installation that reduce the effectiveness of such solutions.

SUMMARY OF THE INVENTION

To solve the problems outlined above, the present invention provides an improved insulated component-wrap insulating product for installations that include significant vertical or substantially vertical cooled surfaces. The present invention incorporates a modified wicking material to interrupt the downward flow of condensate formed at or near the sections of the cooled surface. The condensate from each section may then be transported separately through the insulating material to the exterior surface of the insulated component or installation. By repeatedly interrupting the condensate flow path and providing for horizontal condensate transport, the present invention can improve the performance of the insulation and reduce the damage and deterioration associated with accumulation of condensate in the lower portions of the vertical sections of the insulating layer.

A wicking layer comprising a film, woven or non-woven material or other fibrous media, will be incorporated as part of the insulating duct wrap and configured to be in contact with the cooled surface. The wicking layer is preferably a woven or non-woven material formed from a synthetic polymer. One suitable polymer for manufacturing the wicking material is rayon and includes fibers that are striated, i.e., include channels along the length of the fiber, to form capillary channels within the individual fibers. By providing channels within the fiber itself, the wicking action does not depend solely upon capillary action resulting from the channels formed between two adjacent fibers and will provide improved wicking capability.

In addition to rayon fibers, other polymeric fibers including polyester, nylon, polypropylene (PP) and polyethylene terephthalate (PET), may be manufactured or processed in a manner that will produce fibers including striations or channels on their surface. A number of fiber configurations have been developed that provide a plurality of surface channels for capillary transport of water and have been widely incorporated in active wear for improved comfort. These types of materials can be collectively referred to as capillary surface materials (CSM) and include so-called deep-grooved fibers that have high surface area per unit volume as a result of their complex cross-sectional configuration. The capillary material layer can be provided in different configurations including, for example, a non-woven film or a fine mesh configuration.

When the insulated component is a duct, a portion of the wicking material may also extend into the interior of the air duct, typically through joints in an air handler (duct) system in those situations in which conditions may exist that would result in condensation of water vapor within the duct in addition to or instead of condensation on the duct surface. Such extensions of the wicking material may be placed into the duct at the joints of the metal ducting system during system installation and/or may be inserted through additional openings provided specifically for that purpose. When water vapor condenses on the air duct surface it is transported by the wicking material and evaporated from the wick surface within the air stream being transported by the ducting system.

The use of conditioned, relatively dry, air within the air handler system for evaporating condensate formed at the surface of the duct provides an alternative to transporting the condensate through the insulating layer to a location where it can evaporate into the surrounding air. Such a method and configuration can also be used to reduce or eliminate the openings that are required through the primary insulating layer and the vapor retarding layer to allow for such external evaporation. In many instances, utilizing the ducting system will also provide the shortest path for transporting condensate from cooled surface. The condensate that is evaporated from the wicking material into the passing air stream will then be circulated within the living space, increasing the relative humidity, or transported directed to the return air plenum where it can be removed by the condensing coil of the air-handling unit and be removed to a drain.

In those instances in which the insulated component is a pipe conducting a cool liquid or a mixture of gas and liquid, the interior extension of the wicking material cannot be utilized. As noted above, however, the cool surface will still tend to result in condensate formation on the surface of the pipe and vertically arranged wicking materials will tend to suffer an accumulation of condensate in the lower portions. The wicking material according to the invention, however, is configured to collect the condensate at or near the cool surface and transport the collected condensate away from the cooled surface toward an exterior surface or, if desired, to the interior of a separate component for evaporation.

Various objects and advantages of this invention will become apparent to those skilled in the art from the following detailed description of the preferred embodiment, when read in light of the accompanying drawings.

Figure 1:
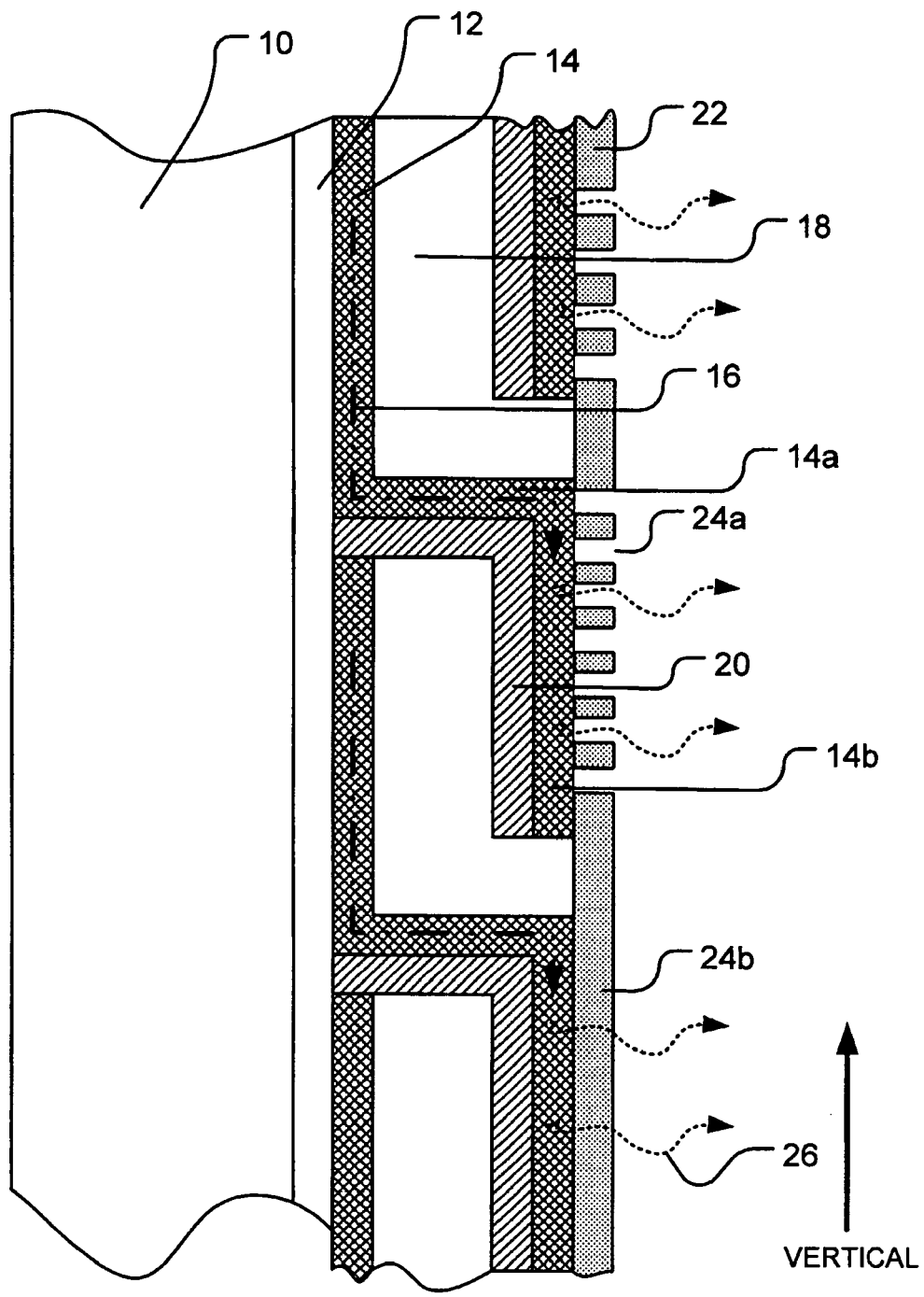
FIG. 1 is a schematic vertical cross-sectional view of a portion of an insulated duct or pipe assembly in accordance with this invention.

These drawings have been provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

As shown in FIG. 1, an elongated, vertically-oriented duct, pipe or other structure 10 having a cool surface 12 is wrapped in or covered with a laminated insulation product that includes a wicking material layer 14, a primary insulating layer 18 and a liquid barrier layer 20. When air containing water vapor (not shown) reaches the cooled surface 12 and the cooled surface is at a temperature at or below the dewpoint of the adjacent air, a portion of the water vapor will condense to form a condensate 16 consisting primarily of water. Due to the effect of gravity and the hydrophilic properties of the wicking layer 14, the condensate 16 will tend to flow downwardly through the wicking layer. Periodically, this flow will be interrupted by a liquid barrier layer 20 that will prevent the condensate from flowing into the adjacent insulating layer 18 and, in combination with a horizontal extension 14a of the wicking material layer 14, will bring the condensate near the surface of the laminated insulation product.

The liquid barrier layer 20, will preferably extend along both the horizontal 14a and external portions 14b of the wicking material layer 14 to prevent or suppress movement of the condensate 16 and water vapor into the primary insulating layer 18. The outermost portions 14b of the wicking material layer 14 may be directly exposed to the exterior environment (not shown), covered with a cover layer 22 that may be perforated to provide a plurality of openings 24a formed therein to allow for evaporation of the condensate 16 as water vapor 26 into the interior space. Alternative covering materials 22 include vapor permeable films 24b that allow water vapor 26 to escape from the wicking material layer without requiring perforations and secondary wicking or evaporation materials that will increase the effective surface area and evaporation rate from the primary wicking material 14. The perforated or vapor permeable portions of the covering layer 22 may be combined with conventional non-permeable portions to suppress or otherwise control the movement of ambient water vapor into the primary insulating layer 18 and thereby reduce the amount of condensate that will be formed on the cooled surface 12.

Figure 2:
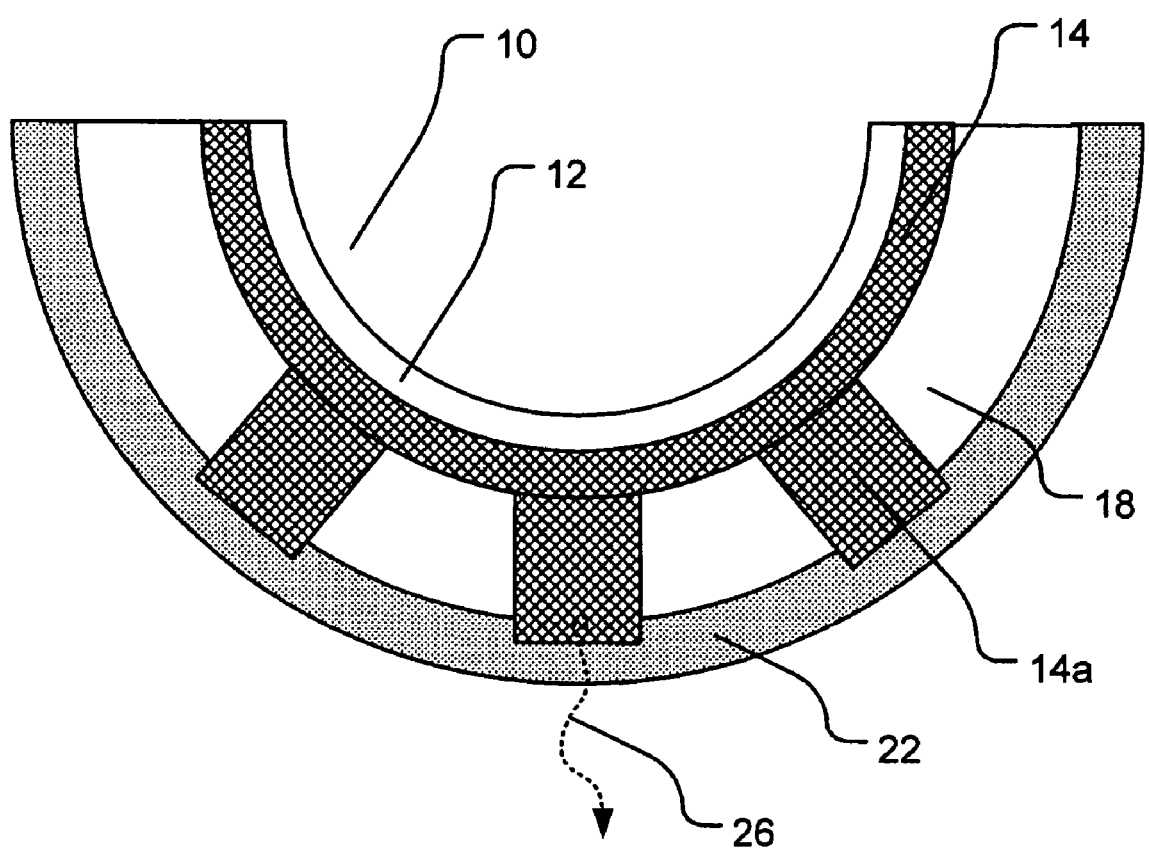
FIG. 2 is a partial horizontal cross-sectional view of a portion of the insulated duct or pipe assembly in accordance with this invention.

As illustrated in FIG. 2, the wicking material layer may be configured with a plurality of extending or transfer portions 14a provided around the circumference of the main wicking material layer 14 to compensate for the increased circumference of the exterior portion of the insulation product and to simplify installation.

Figure 3:
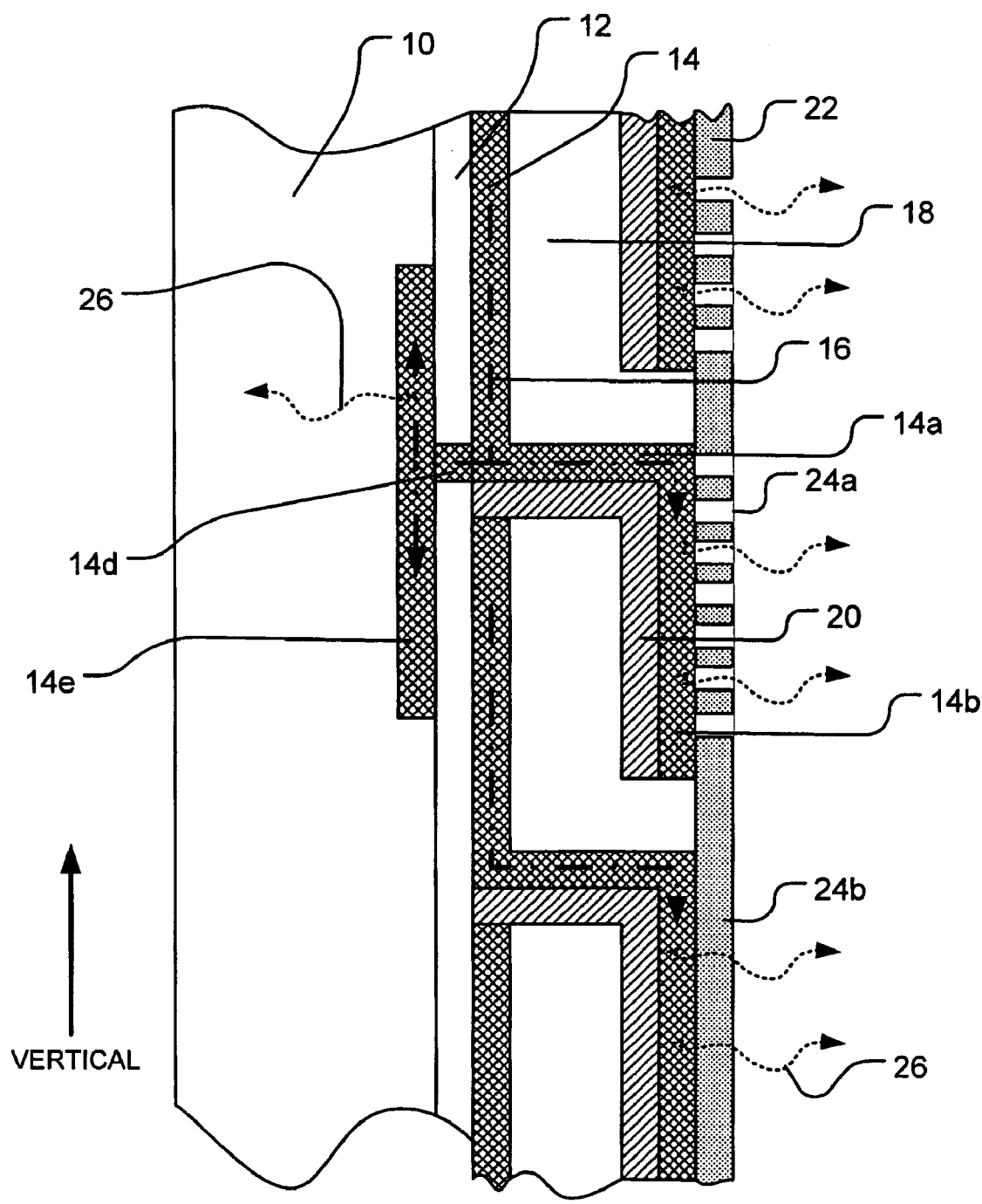
FIG. 3 is a schematic vertical cross-sectional view of a portion of an insulating duct or pipe assembly in accordance with another embodiment of this invention.

As illustrated in FIG. 3, when the insulated component is an air or gas handling duct, the wicking material layer may include shorter transfer portions 14d to internal wicking materials and/or evaporative surfaces 14e provided within the duct 10 to provide for evaporation of at least a portion of the condensate into the conditioned gas stream flowing through the duct. The internal materials 14e may be further modified to increase the wetted surface area available for evaporation (not shown) or configured in association with liquid barrier materials (not shown) to separate the condensate from the inside surface of the duct 10. The internal materials 14e may also incorporate or be treated with one or more stable compounds and/or compositions that will tend to suppress microbial and fungal growth. The transfer portions 14d and the internal materials 14e may be used singly (not shown) or, as illustrated, in combination with the external wicking and evaporative regions 14a and 14b.

Figure 4:
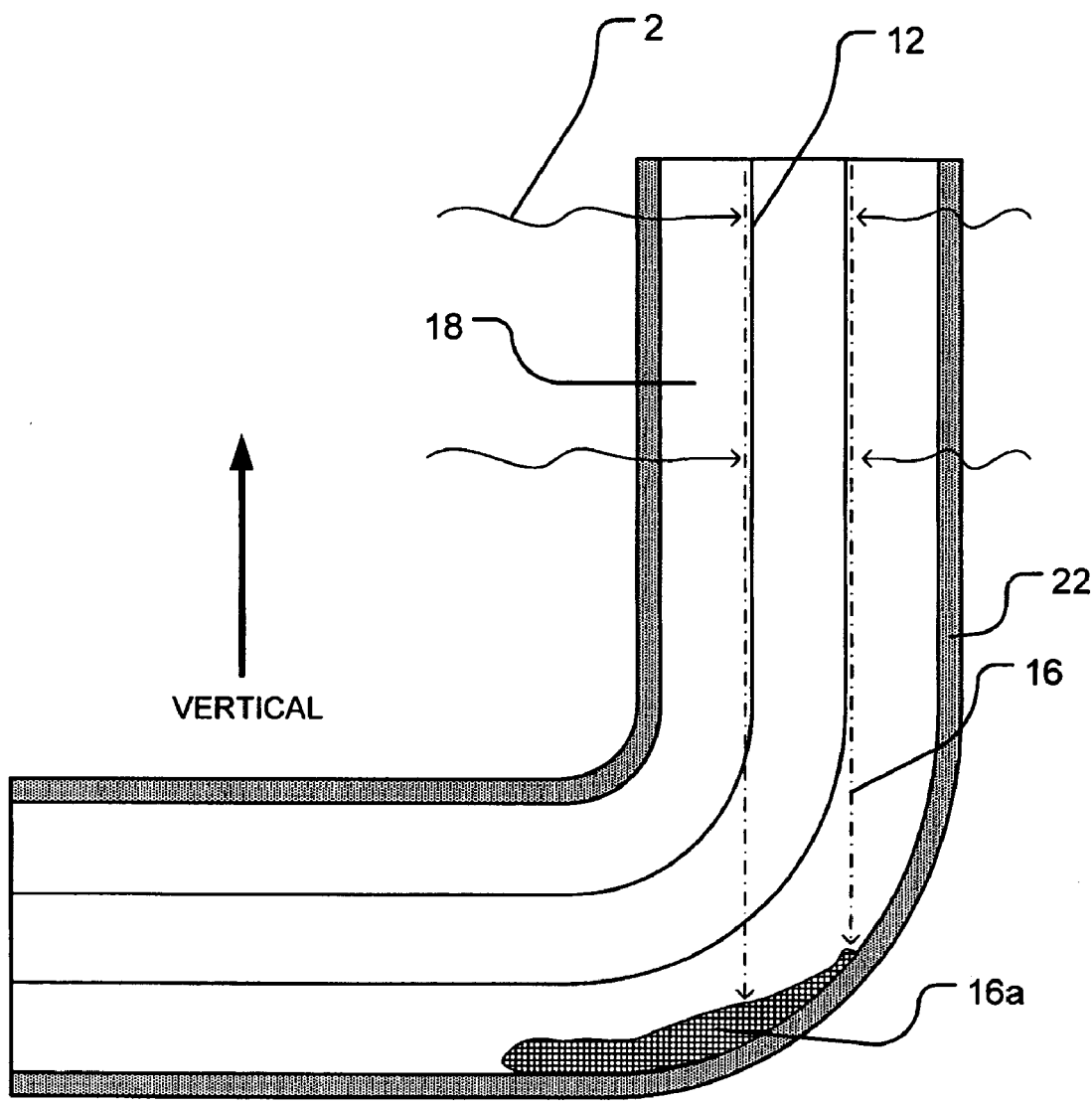
FIG. 4 is a cross-sectional view of a conventional installation of pipe insulation materials.

Although FIGS. 1-3 have generally illustrated the application of the present invention in connection with cooling ducts, as reflected in FIGS. 5-7D, the exemplary embodiment illustrated in FIG. 1 is equally applicable to pipes transporting chilled liquids or vessels containing chilled liquids that have substantially vertical surfaces. As reflected in FIG. 4, when conventional insulating products are used in substantially vertical applications, condensation 16 forming on the cooled surface 12 tends to flow downwardly through the primary insulation 18 with the condensate tending to accumulate 16a in the lower portions of the insulation when a barrier layer 22 is in place or flow out of the insulation when no barrier layer is in use (not illustrated). In either case, the accumulation of the condensate in the insulation will tend to reduce the effectiveness of the insulation and may give rise to other health, maintenance and/or aesthetic concerns.

Figure 5:
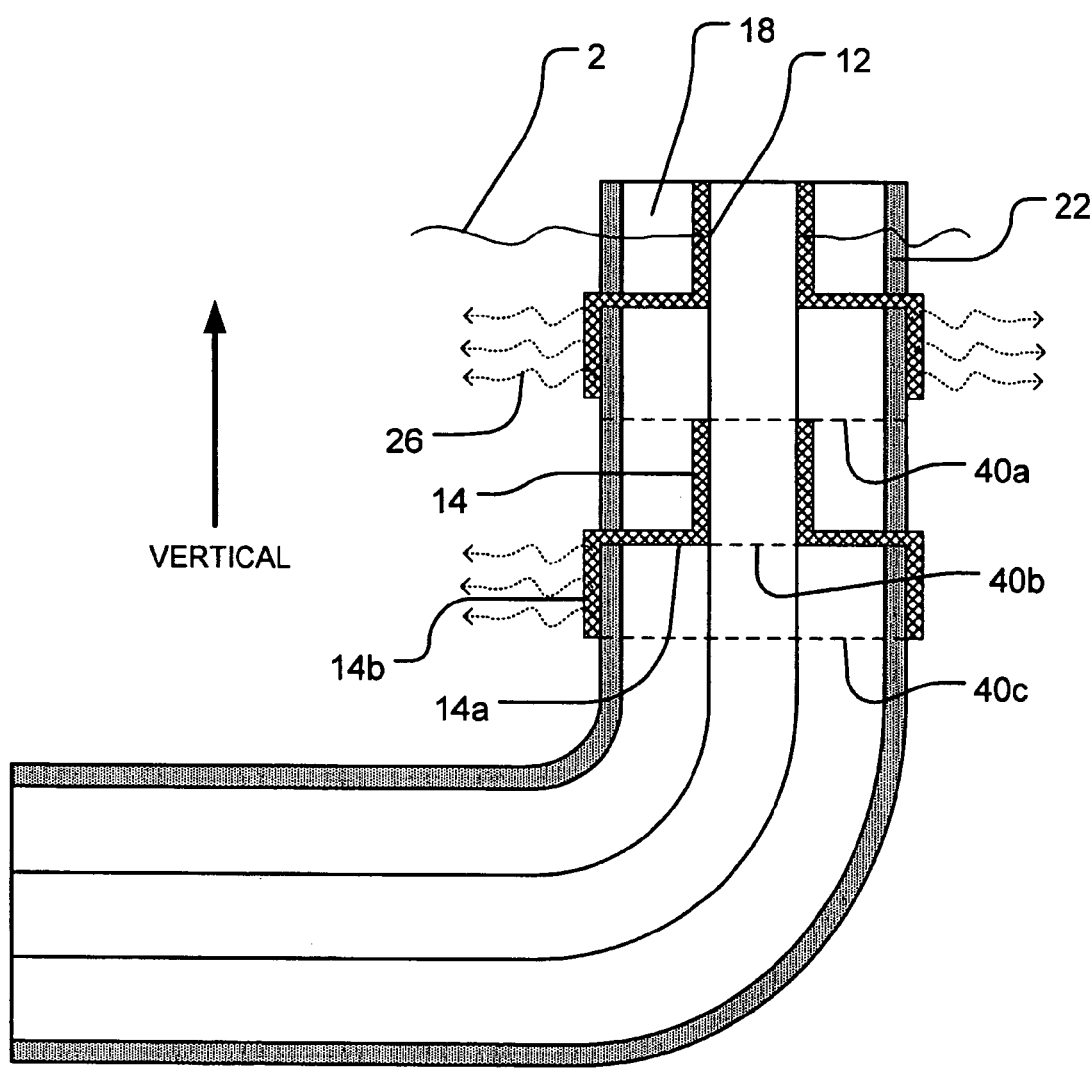
FIG. 5 is a cross-sectional view of an exemplary embodiment of the present invention applied to a section of pipe or duct having both horizontal and vertical segments.

As illustrated in FIG. 5, exemplary embodiments of the present invention may include wicking materials 14 arranged in a generally repeating pattern along an inclined (not shown) or substantially vertical cooled surface 12 that will collect condensate resulting from the infiltration or diffusion of water vapor 2 to the cooled surface, transport the condensate laterally through or between adjacent sections of insulating material utilizing another wicking material element 14a (which can be an extension of the material 14) to an evaporating portion 14b, typically provided at or near the surface of the insulating assembly and may cover at least a portion of the facing or barrier layer 22, where the condensate can evaporate 26 into the surrounding air. As illustrated in FIG. 5, the insulating assembly can be provided in standard unit sections that may be sequentially applied to the cooled surface 12 to enclose the cooled surface substantially or completely. Depending on the particular construction of the unit sections, the repeating units may produce one or more joints, for example 40a, 40b or 40c, where adjacent unit sections abut one another.

Figure 6:
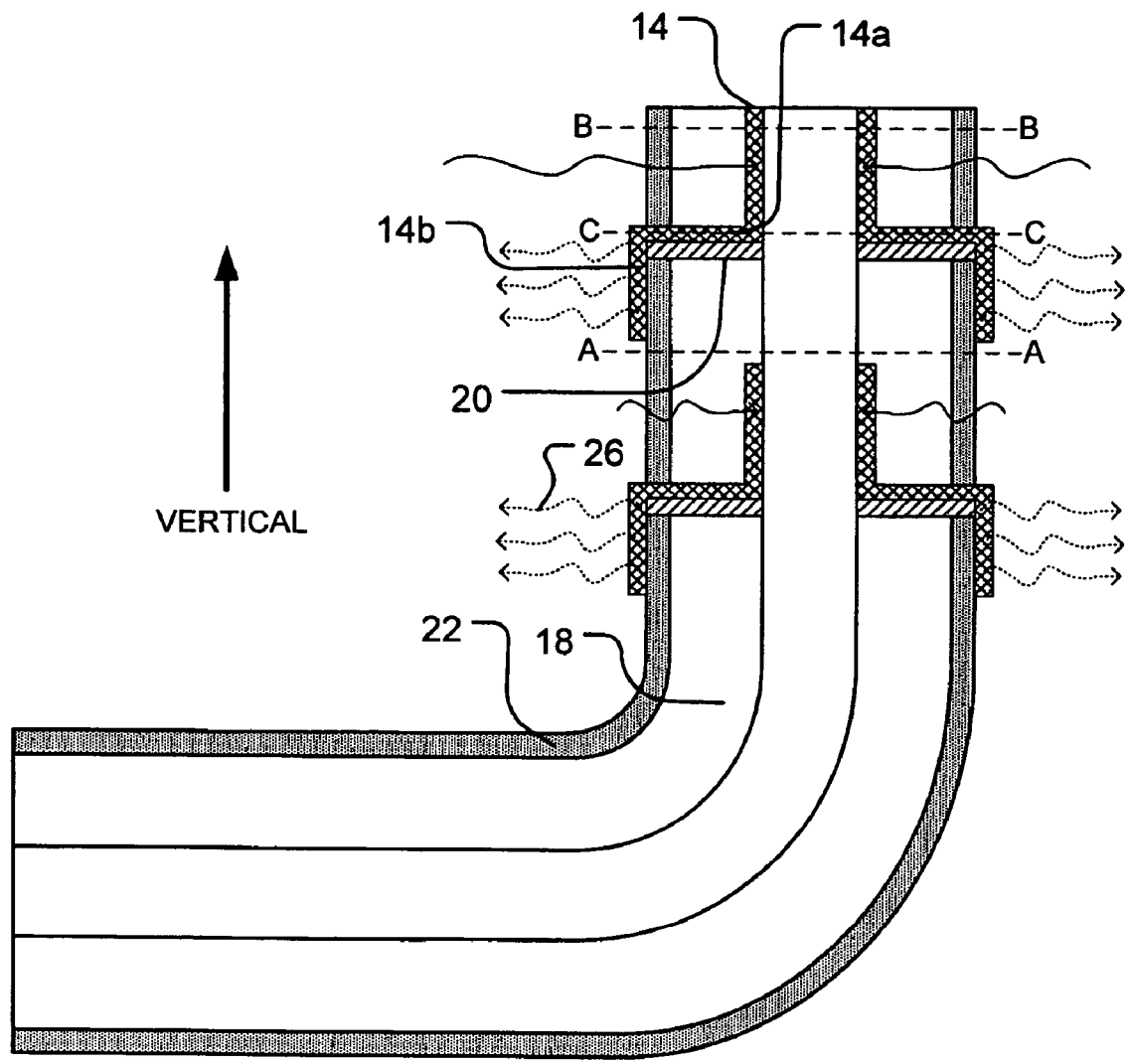
FIG. 6 is a cross-sectional view of another exemplary embodiment of the present invention applied to a section of pipe or duct having both horizontal and vertical segments.

As illustrated in FIG. 6, the exemplary embodiment illustrated in FIG. 5 may be modified to include a liquid barrier film 20 or films that will also serve to control or eliminate the generally downward flow of the condensate within the insulating assembly. The liquid barrier film may be provided adjacent some or all of the wicking material layer(s) to improve the collection and transportation of condensate within the insulating assembly. Further, as illustrated in FIG. 6, the evaporating portion of the wicking material may form a portion of the outer surface of the insulating assembly or may further be covered with one or more perforated, porous, vapor permeable or other layer(s) (not shown) that will conceal and/or protect the wicking material while still allowing the condensate reaching the evaporative portion 14b to evaporate into the surrounding air.

Figure 7A:
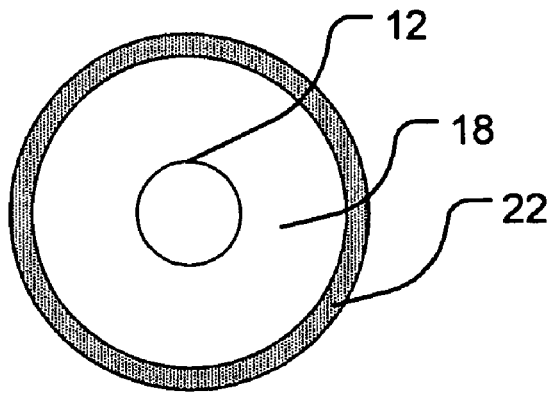
FIGS. 7A-D correspond to cross-sectional views of the exemplary embodiment of the present invention illustrated in FIG. 6 taken along lines A-A, B-B and C-C through the vertical segment of the pipe or duct and the corresponding insulating assembly.
Figure 7B:
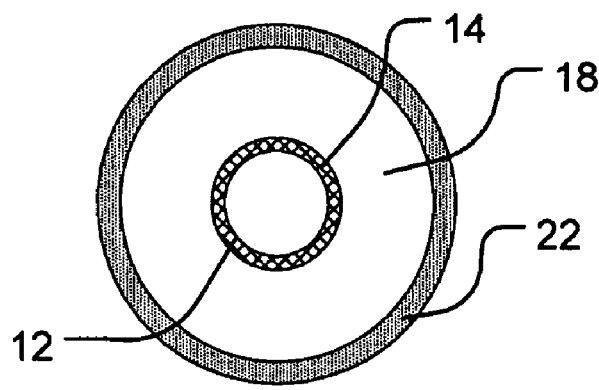
Figures 7C, 7D:
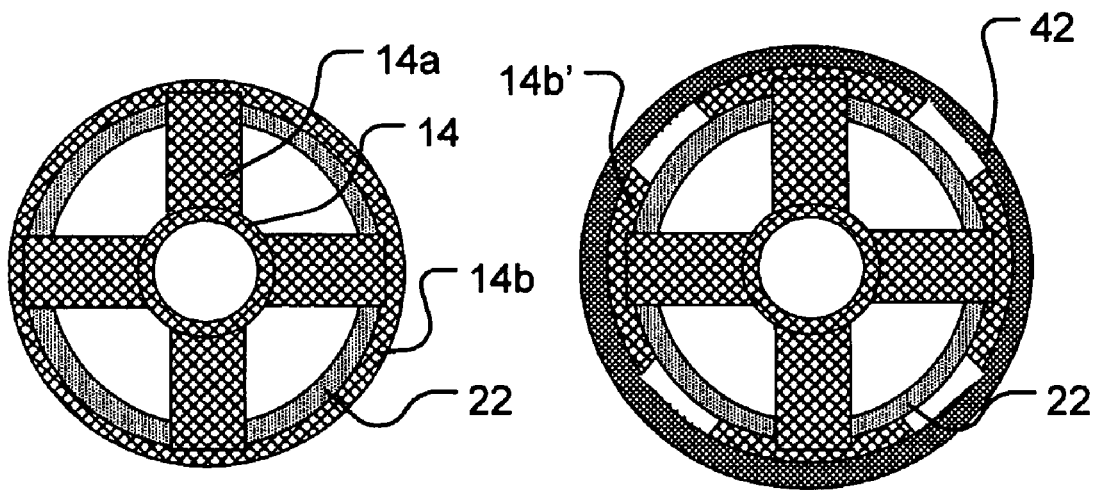

As illustrated in FIGS. 7A-C, which correspond generally to cross-sections of the exemplary embodiment illustrated in FIG. 6 taken along lines A-A, B-B and C-C, the insulating assembly may assume a number of configurations depending on the nature of the installation and conditions such as the anticipated condensate volume under normal conditions, the range of seasonal or episodic variations in the condensate volume, ambient conditions such as temperature and relative humidity that will affect the evaporation rate, the configuration of the evaporating portion of the wicking material for promoting evaporation. As illustrated in FIG. 7A, portions of the insulating assembly may not include any wicking material layer(s), although other configurations (not shown) could provide a layer of wicking material on substantially the entire cooled surface, and would include only the cooled surface 12, in this instance a pipe, a layer of primary insulating material 18 and, optionally, a vapor barrier layer 22 to suppress the migration of water vapor from the environment toward the cooled surface. As illustrated in FIG. 7B, a portion of the insulating assembly may include a layer of wicking material 14 adjacent the cooled surface 12 where it will tend to collect any condensate forming on the cooled surface. As illustrated in FIG. 7C, the collecting portion or portion(s) of the wicking material will be in communication with a transporting portion 14a of the same or complementary wicking material that will tend to transport the collected condensate away from the cooled surface 12 and to an evaporating portion 14b of the same or another complementary wicking material. As illustrated in FIGS. 7C and 7D, the transporting portion 14a may be configured as a series of radial segments that may or may not constitute an extended portion of the basic wicking material 14. As illustrated in FIG. 7C, the evaporating portion 14b of the insulating assembly may have a surface area considerably larger than that of the transporting portion 14a and may completely surround an outer surface of the primary insulating material 18 and/or a barrier layer 22. In another exemplary embodiment as illustrated in FIG. 7D, the evaporating portion 14b' of the wicking material may not be continuous, but may, as illustrated, be provided in strips along an outer surface of the insulating assembly or may be partly (not shown) or completely covered with an outer layer 42 that will still allow condensate to evaporate into the surrounding.

The principle and mode of operation of this invention have been described in connection with certain exemplary embodiments and preferred configurations. However, it should be noted that this invention may be practiced otherwise than as specifically illustrated and described without departing from its scope.

We claim:

1. A system for insulating a cooled surface comprising:
   a primary insulating material; and
   a wicking material, the wicking material having a collection portion adjacent the cooled surface for collecting condensate, a transport portion for removing condensate from the collection portion and an evaporative portion separated from the collecting portion for receiving condensate from the transport portion; and
   a liquid barrier in contact with a portion of the cooled surface provided between at least a portion of one surface of the transport portion of the wicking material and the primary insulating material.

2. A system for insulating a cooled surface according to claim 1, wherein:
   the transport portion of the wicking material extends though the primary insulating material; and
   the evaporative portion of the wicking material is configured in a substantially vertical orientation adjacent an exterior surface of the primary insulating material.

3. A system for insulating a cooled surface according to claim 1, wherein:
   the transport portion of the wicking material extends through the cooled surface; and
   the evaporative portion of the wicking material is arranged within a gas passage defined at least in part by the cooled surface.

4. A system for insulating a cooled surface according to claim 2, wherein:
   the transport portion of the wicking material also extends through the cooled surface; and
   a second evaporative portion of the wicking material is arranged within a gas passage defined at least in part by the cooled surface.

5. A system for insulating a cooled surface according to claim 1, wherein:
   the liquid barrier is provided between at least one surface of the evaporative portion of the wicking material and the primary insulating material.

6. A system for insulating a cooled surface according to claim 1, further comprising:

a cover layer arranged over at least a section of the evaporative portion of the wicking material, the cover layer configured to allow water vapor transport through the cover layer.

7. A system for insulating a cooled surface according to claim 6, wherein:
the cover layer includes a material selected from a group consisting of perforated sheet materials and vapor permeable sheet materials.

8. A system for insulating a cooled surface according to claim 1, wherein:
the evaporative portion of the wicking material is configured to increase the effective surface area relative to a covered portion of the primary insulating material.

9. A system for insulating a cooled surface according to claim 3, wherein:
the evaporative portion of the wicking material is configured to increase the effective surface area relative to a covered portion of the cooled surface.

10. A system for insulating a cooled surface according to claim 4, wherein:
the second evaporative portion of the wicking material is configured to increase the effective surface area relative to a covered portion of the cooled surface.

11. A system for insulating a cooled surface according to claim 1, wherein the cooled surface and the collection portion of the wicking material are configured in a substantially vertical orientation:
the transport portion of the wicking material includes a substantially horizontal section having an upper surface and a lower surface; and
the liquid barrier in contact with a portion of the cooled surface provided between at least a portion of one surface of the transport portion of the wicking material and the primary insulating material is further provided on at least a lower surface of the transport portion of the wicking material.

12. An insulation assembly for application to a cooled surface that is inclined from horizontal comprising:
a plurality of segments arranged along the cooled surface, each segment including a primary insulation material and a wicking material, the wicking material including a collection portion of a first wicking material arranged for installation adjacent the cooled surface,
a transport portion of a second wicking material extending from a lower portion of the collection portion and configured to extend outwardly front the cooled surface,
a liquid barrier in contact with a portion of the cooled surface provided between at least a portion of one surface of the transport portion of the second wicking material and the primary insulating material; and
an evaporative portion of a third wicking material configured for installation adjacent an outer surface of the insulation assembly.

13. An insulation assembly for application to cooled surface inclined from horizontal according to claim 12, wherein:
wherein the transport portion of the wicking material extends along at least a region of a generally horizontal joint formed between adjacent segments.

14. A system for insulating a cooled surface according to claim 12, wherein:
the first, second and third wicking materials are substantially the same.

15. A system for insulating a cooled surface according to claim 12, wherein:
the third wicking material is configured for increasing an evaporation rate.

16. A system for insulating a cooled surface according to claim 12, wherein:
a width of the first and second wicking materials is substantially the same.

17. A system for insulating a cooled surface according to claim 12, wherein:
a width of the first and second wicking materials is substantially the same, the second wicking material being arranged in plurality of generally radially aligned segments between the first and third wicking materials.

18. A system for insulating a cooled surface according to claim 12, wherein:
the third wicking material is arranged in a generally circumferential band on an outer surface of the primary insulating material.

19. A system for insulating a cooled surface according to claim 12, further comprising:
a cover layer provided on at least a region of the evaporative portion, the cover layer being selected to allow for evaporation of condensate from the evaporative portion to a surrounding gas.

20. A system for insulating a cooled surface according to claim 19, wherein:
the cover layer includes at least one material selected from a group consisting of perforated films, porous films and vapor permeable films; and
the surrounding gas is air.

* * * * *